US009145856B2

(12) United States Patent
Johnson et al.

(10) Patent No.: US 9,145,856 B2
(45) Date of Patent: Sep. 29, 2015

(54) SYSTEMS AND METHODS FOR HIGH EFFICIENCY RELIABLE CATALYST DELIVERY TO INTERNAL COMBUSTION ENGINES

(75) Inventors: Debra Johnson, Phoenix, AZ (US); David B. Marlar, Chandler, AZ (US)

(73) Assignee: ECOMPLETE, LLC, Chandler, AZ (US)

( * ) Notice: Subject to any disclaimer, the term of this patent is extended or adjusted under 35 U.S.C. 154(b) by 994 days.

(21) Appl. No.: 13/278,626

(22) Filed: Oct. 21, 2011

(65) Prior Publication Data

US 2012/0118387 A1    May 17, 2012

Related U.S. Application Data

(60) Provisional application No. 61/406,073, filed on Oct. 22, 2010.

(51) Int. Cl.
*F02M 27/02* (2006.01)
*F17D 3/00* (2006.01)
*F02M 35/10* (2006.01)
*F16K 31/06* (2006.01)

(52) U.S. Cl.
CPC ......... *F02M 27/02* (2013.01); *F02M 35/10209* (2013.01); *Y10T 137/0318* (2015.04); *Y10T 137/794* (2015.04)

(58) Field of Classification Search
CPC .... F02M 27/02; F02M 35/10209; F17D 3/00; F16K 31/12; F16K 31/06
USPC ........... 123/434, 670, 198 A, 672; 137/1, 544
See application file for complete search history.

(56) References Cited

U.S. PATENT DOCUMENTS 6,817,347 B2    11/2004  Noble
6,882,929 B2 *   4/2005  Liang et al. ................... 701/115
(Continued)

FOREIGN PATENT DOCUMENTS

EP    1686251 A1    8/2006
EP    1686252 A1    8/2006
(Continued)

OTHER PUBLICATIONS

International Preliminary Report on Patentability dated Apr. 23, 2013 in Application No. PCT/US2011/057215.
(Continued)

*Primary Examiner* — Hieu T Vo
(74) *Attorney, Agent, or Firm* — Snell & Wilmer L.L.P.

(57) ABSTRACT

The present disclosure relates to improved systems and methods for providing a catalyst to an internal combustion engine. To this end, the systems and methods described herein may redirect a measured flow of pressurized air from an existing engine air flow through a catalyst reservoir to create a catalytic aerosol or mist. The aerosol or mist may be reinjected or delivered to the air intake of an engine. In various embodiments, the systems and methods disclosed herein utilize an existing engine air flow to produce a catalytic aerosol and/or mist rather than utilizing electric pumps or Venturi draws. Air flow may be controlled, adjusted, and/or optimized based upon an engine to which the disclosed systems are coupled based upon one or more passive flow control components (e.g., filters, restrictors, orifices, and/or valves).

14 Claims, 3 Drawing Sheets

(56) References Cited

U.S. PATENT DOCUMENTS

| | | |
|---|---|---|
| 6,962,143 B2 | 11/2005 | Ryan, III et al. |
| 7,165,399 B2 | 1/2007 | Stewart |
| 7,263,822 B2 * | 9/2007 | Bender et al. ............... 60/274 |
| 7,275,374 B2 | 10/2007 | Stewart et al. |
| 7,328,577 B2 | 2/2008 | Stewart et al. |
| 7,467,614 B2 | 12/2008 | Stewart et al. |
| 7,584,905 B2 * | 9/2009 | Cunningham et al. ........ 239/338 |
| 7,591,135 B2 | 9/2009 | Stewart |
| 7,828,225 B2 | 11/2010 | Cunningham |
| 7,849,674 B2 * | 12/2010 | Masuda et al. ............... 60/286 |
| 8,266,947 B2 * | 9/2012 | Yoeda ..................... 73/114.55 |
| 2003/0131830 A1 | 7/2003 | Noble |
| 2005/0011485 A1 | 1/2005 | Ryan, III et al. |
| 2005/0263139 A1 | 12/2005 | Ryan, III et al. |
| 2006/0137335 A1 | 6/2006 | Stewart et al. |
| 2006/0137340 A1 | 6/2006 | Stewart et al. |
| 2006/0137346 A1 | 6/2006 | Stewart et al. |
| 2006/0137347 A1 | 6/2006 | Stewart et al. |
| 2007/0101977 A1 | 5/2007 | Stewart et al |
| 2009/0288627 A1 | 11/2009 | Cunningham |

FOREIGN PATENT DOCUMENTS

| | | |
|---|---|---|
| EP | 1831516 A1 | 9/2007 |
| EP | 1864012 A1 | 12/2007 |
| EP | 1831516 B1 | 9/2010 |
| EP | 1864012 B1 | 10/2010 |
| JP | 2006189050 A | 7/2006 |
| JP | 2006189053 A | 7/2006 |
| JP | 2008525719 A | 7/2008 |
| JP | 2008534856 A | 8/2008 |
| WO | 2005017335 A1 | 2/2005 |
| WO | 2006071523 A1 | 7/2006 |
| WO | 2006107525 A1 | 10/2006 |
| WO | 2008082932 A1 | 7/2008 |
| WO | 2009142648 A1 | 11/2009 |

OTHER PUBLICATIONS

International Search Report and Written Opinion dated May 16, 2012 in Application No. PCT/US2011/057215.

* cited by examiner

SYSTEMS AND METHODS FOR HIGH EFFICIENCY RELIABLE CATALYST DELIVERY TO INTERNAL COMBUSTION ENGINES

CROSS-REFERENCE TO RELATED APPLICATIONS

This application is a non-provisional of, and claims priority to, U.S. Provisional Patent Application No. 61/406,073, entitled "Catalytic Aerosol Injection Pressurized Air Redirection Delivery System and Method," filed Oct. 22, 2010, which is hereby incorporated by reference in its entirety.

FIELD OF INVENTION

The present invention generally relates to the delivery of catalysts to internal combustion engines.

BACKGROUND OF THE INVENTION

Vehicles powered by internal combustion engines are significant contributors to air pollution and account for, by some estimates, more than 25% of the total energy and 70% of the total petroleum consumed in the United States. Further, fuel consumption and the pollution resulting from the use of internal combustion engines impose a variety of health, economic, and environmental burdens on society. For example, exhaust byproducts of internal combustion engines make the air more difficult to breathe and are generally thought to harm the natural environment. Moreover, liberal and/or wasteful use of the Nation's and World's petroleum reserves depletes these reserves at an unwise and unnecessary rate.

Numerous solutions exist for reducing fuel consumption in internal combustion engines, including some that utilize catalytic aerosols to improve combustion efficiencies. For instance, prior art systems have relied upon the Venturi effect and/or an electric pump to produce and deliver an aerosol to a combustion chamber of an engine. However, these mechanisms can be inconsistent, unreliable, and/or expensive, particularly relative to their benefits. For instance, electric pumps are typically prone to failure and are often quite expensive. Likewise, systems utilizing the Venturi effect are typically sensitive to their position within an air stream and/or they may not deliver the correct flow rate for a requisite pressure and volume. Consequently, and particularly in light of variations between engines which may occur as a result of manufacturer, class, year and/or equipment configuration, insertion of prior art Venturi systems is often based on guesswork. Guesswork, in turn, may lead to a variety of unintended and/or unwanted consequences—e.g., inconsistent and/or unreliable installation results, performance variations, and the like. Thus, a need exists for system that is able to reliably, consistently, and at a low cost deliver a catalytic aerosol to an internal combustion engine.

SUMMARY OF THE INVENTION

The present disclosure relates to systems, articles of manufacture, and methods for delivering a catalyst to an internal combustion engine, which may, in turn, permit the engine to operate at a higher efficiency and/or, in general, to combust more efficiently. Better combustion efficiencies may result in fewer pollutants and/or exhaust byproducts, as well as reduced fuel consumption.

In accordance with exemplary embodiments, a system and method are configured for redirecting a portion of pressurized air flowing from an air intake (e.g., a turbocharger, a compressor, and the like) through a catalyst reservoir or a nebulizer, and injecting (or re-injecting) the air containing the catalyst (which may comprise a catalytic aerosol or mist) to an unpressurized, partially pressurized, or pressurized air intake of an internal combustion engine. Air may be channeled through one or more passive flow control components (e.g., filters, restrictors, orifices, and/or check valves, as appropriate to a specific engine application) to limit the air flow through the catalyst to a desired and/or optimal rate.

In accordance with various exemplary embodiments, the systems, articles, and methods disclosed herein may regulate and deliver a prescribed volume of metered air to a catalyst reservoir based, for example, on a size of a restrictor (e.g., a filter and/or a valve), or the load of the engine. More particularly, a check valve may be included, in which case air flow through a catalyst reservoir may be reduced or cut off, as for example, when an engine to which the systems are coupled is operating at a reduced load, such as idle. In various of these embodiments, pressurized air may be used to generate a mist by flowing it to a device, such as a passive nebulizer, which may be coupled to, or part of, a catalytic reservoir. Thus, in various embodiments, a mist may be generated instead of, or in addition to, creating a catalytic aerosol. In various embodiments, the systems, articles, and methods disclosed herein may consistently produce and/or regulate a quantity of aerosol or mist entering an engine air intake stream (i.e., irrespective of the application or engine to which these systems are coupled) and may, in addition, be free of disruption from mechanical and/or electrical failures, as there are relatively few moving (e.g., electrical and electromechanical) parts.

These and other features and advantages of the invention will be more fully understood from the following description of certain specific embodiments of the invention take together with the accompanying drawings.

BRIEF DESCRIPTION OF THE DRAWINGS

The exemplary embodiments of the present invention will be described in conjunction with the accompanying drawing figures in which like numerals denote like elements, and.

DETAILED DESCRIPTION

Figure 1A:
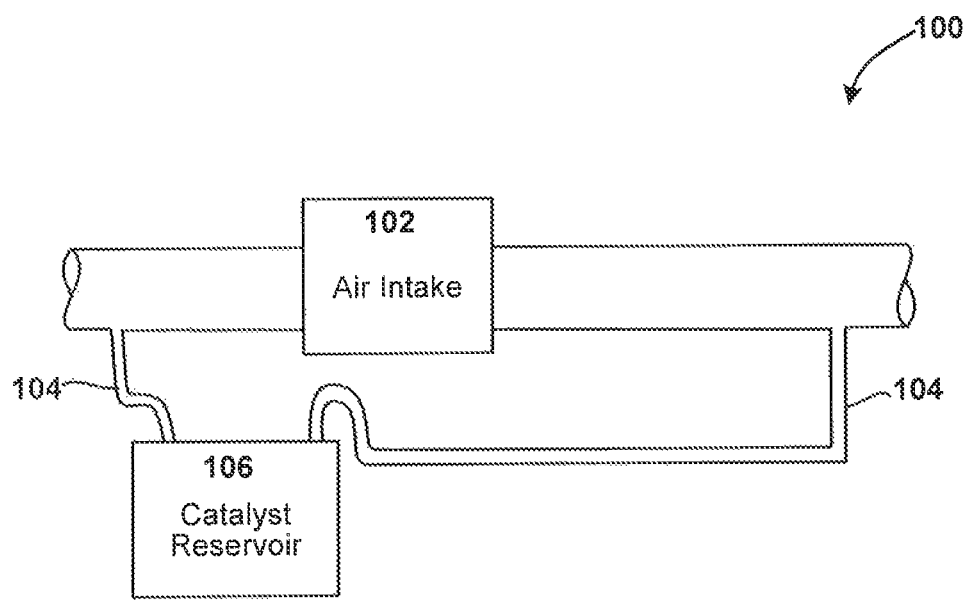
FIG. 1A illustrates a block diagram of an exemplary system for introducing a catalytic aerosol or mist to an engine air intake.

Persons skilled in the art will readily appreciate that various aspects of the present invention may be realized by any number of methods and apparatuses configured to perform the intended functions. Stated differently, other methods and apparatuses may be incorporated herein to perform the intended functions. It should also be noted that the accompanying drawing figures referred to herein are not all drawn to scale, but may be exaggerated to illustrate various aspects of the present invention, and in that regard, the drawing figures should not be construed as limiting. Finally, although the present invention may be described in connection with various principles and beliefs, the present invention should not be bound by theory.

In accordance with various aspects of the present invention, improved, more efficient, and simplified apparatuses, systems, and methods for mixing air with one or more catalysts are provided.

Further, while other embodiments may be described below, in general, and referring to FIG. 1A, a system 100 for delivering a catalyst to an internal combustion engine, which may permit the engine to operate at a higher efficiency and/or, in general, to combust more efficiently, is shown. Better combustion efficiencies may, in turn, result in fewer pollutants and/or exhaust byproducts, as well as reduced fuel consumption. System 100 thus comprises an engine air intake 102, a bypass portion 104, and/or a catalyst reservoir 106.

Air intake 102 may comprise a system or device for pressurizing air, such as, for example, a turbocharger, a supercharger, and/or any other type of air compressor and/or pressurizer. In various embodiments, air intake 102 may comprise an existing air intake, such as a turbocharger, a supercharger, and/or any other type of air compressor and/or pressurizer that is part of an existing engine assembly. Stated another way, in various embodiments, air intake 102 may not comprise an auxiliary or incremental air intake device. Rather, air intake 102 may comprise a part of an engine or engine assembly which, for example, is installed in order to blow or deliver airflow to the engine.

Bypass portion 104 may comprise any type of hollow channel or tube through which air may flow or through which air may be permitted to flow. Bypass portion 104 may comprise one or more filters, valves, restrictors, orifices, and the like, each of which may modulate a flow rate, remove impurities, respond to a pressure differential, and the like. Bypass portion 104 may couple to air intake 102 and/or catalyst reservoir 106. More particularly, in various embodiments, bypass portion 104 may couple an input of air intake 102 to an output of catalyst reservoir 106. Further, in various embodiments, bypass portion 104 may couple an output of air intake 102 to an intake of catalyst reservoir 106.

Catalyst reservoir 106 may comprise any type of reservoir or container configured or configurable to hold a catalyst. In various embodiments, catalyst reservoir 106 comprises a nebulizer.

In operation, air intake 102 may pressurize and/or compress a volume of air, which may be delivered through bypass portion 104 to catalyst reservoir 106. Inside catalyst reservoir 106, this pressurized air may assist in and/or cause the creation of a catalytic aerosol and/or mist. The catalytic aerosol and/or mist may exit catalyst reservoir 106 through bypass portion 104 and reenter air intake 102, where it may pass from air intake 102 into an internal combustion engine.

Figure 1B:
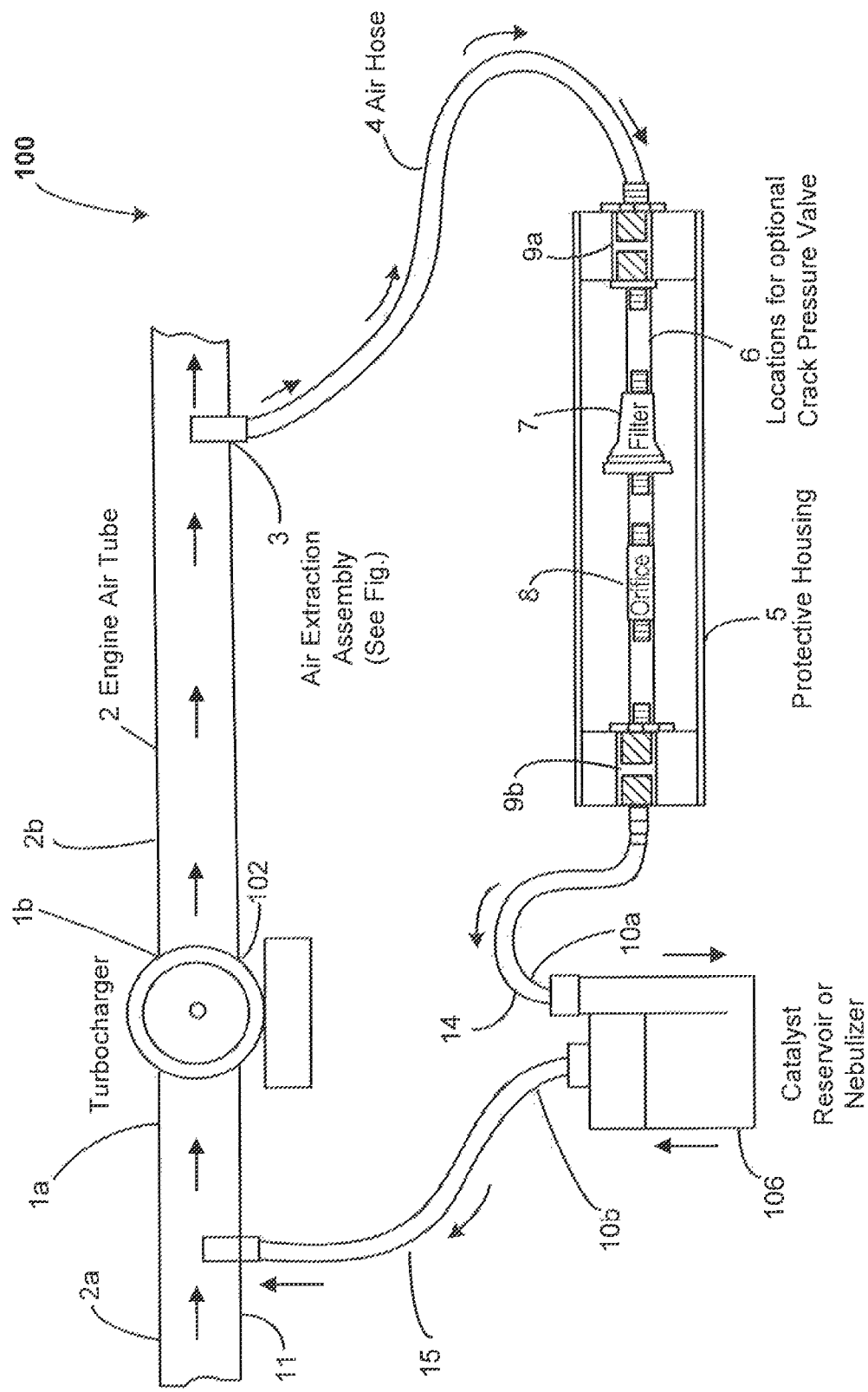
FIG. 1B illustrates a schematic side view of an exemplary system for introducing a catalytic aerosol or mist to an engine air intake.

The exemplary system 100 can comprise various components configured in various manners for facilitating the delivery of a catalyst to an internal combustion engine. For example, in accordance with an exemplary embodiment, and with reference to FIG. 1B, an exemplary aerosol injection and pressurized air redirection delivery system 100 may comprise an air intake 102, an engine air tube 2, an air extraction assembly 3, an air hose 4, a protective housing 5, a valve 6, a filter 7, an orifice 8, a connector 9a, a connector 9b, a catalyst reservoir 106, an injector fitting 11, an air hose 14, and/or a return injector hose 15. Together, one or more of the air intake 102, air tube 2, air extraction assembly 3, air hose 4, protective housing 5, valve 6, filter 7, orifice 8, connector 9a, connector 9b, catalyst reservoir 106, injector fitting 11, air hose 14, and/or return injector hose 15 may be referred to herein as a "bypass," a "bypass loop," a "bypass portion," and/or a "bypass hose" 104. In various embodiments, system 100 may be installed in, coupled to, and/or used with a variety of types of internal combustion engines, including, but not limited to, diesel engines, gasoline engines, construction equipment engines, engines installed in vehicles designed for off-road and/or on-road use, marine engines, and the like.

In an embodiment, as described elsewhere herein, air intake 102 may comprise a system or device for pressurizing air, such as, for example, a turbocharger, a supercharger, and/or any other type of air compressor and/or pressurizer. In various embodiments, air intake 102 may comprise an existing air intake, such as a turbocharger, a supercharger, and/or any other type of air compressor and/or pressurizer that is part of an existing engine assembly. Stated another way, in various embodiments, air intake 102 may not comprise an auxiliary or incremental air intake device. Rather, air intake 102 may comprise a part of an engine or engine assembly which, for example, is installed in order to blow or deliver airflow to the engine. Air intake 102 may comprise both an input 1a and an output 1b.

Engine air tube 2 may comprise any type of conduit or channel suitable for conducting or transferring air flow from one point to another. For example, engine air tube 2 may comprise a rubber tube or hose, a plastic tube or hose, a steel reinforced rubber and/or plastic tube or hose, a metal braided tube or hose, and/or any other type of suitable tube or hose. Engine air tube 2 may comprise a first portion 2a and a second portion 2b, and it may be coupled to both the input 1a and output 1b of air intake 102. For example, and in various embodiments, engine air tube 2 may comprise a first portion 2a, which may be separated from a second portion 2b by air intake 102. The output of air intake 102 may be coupled (e.g., after passing through air extraction assembly 3) to an air intake manifold of an internal combustion engine. An air cooler may receive air output from engine air tube 2.

Figure 2:
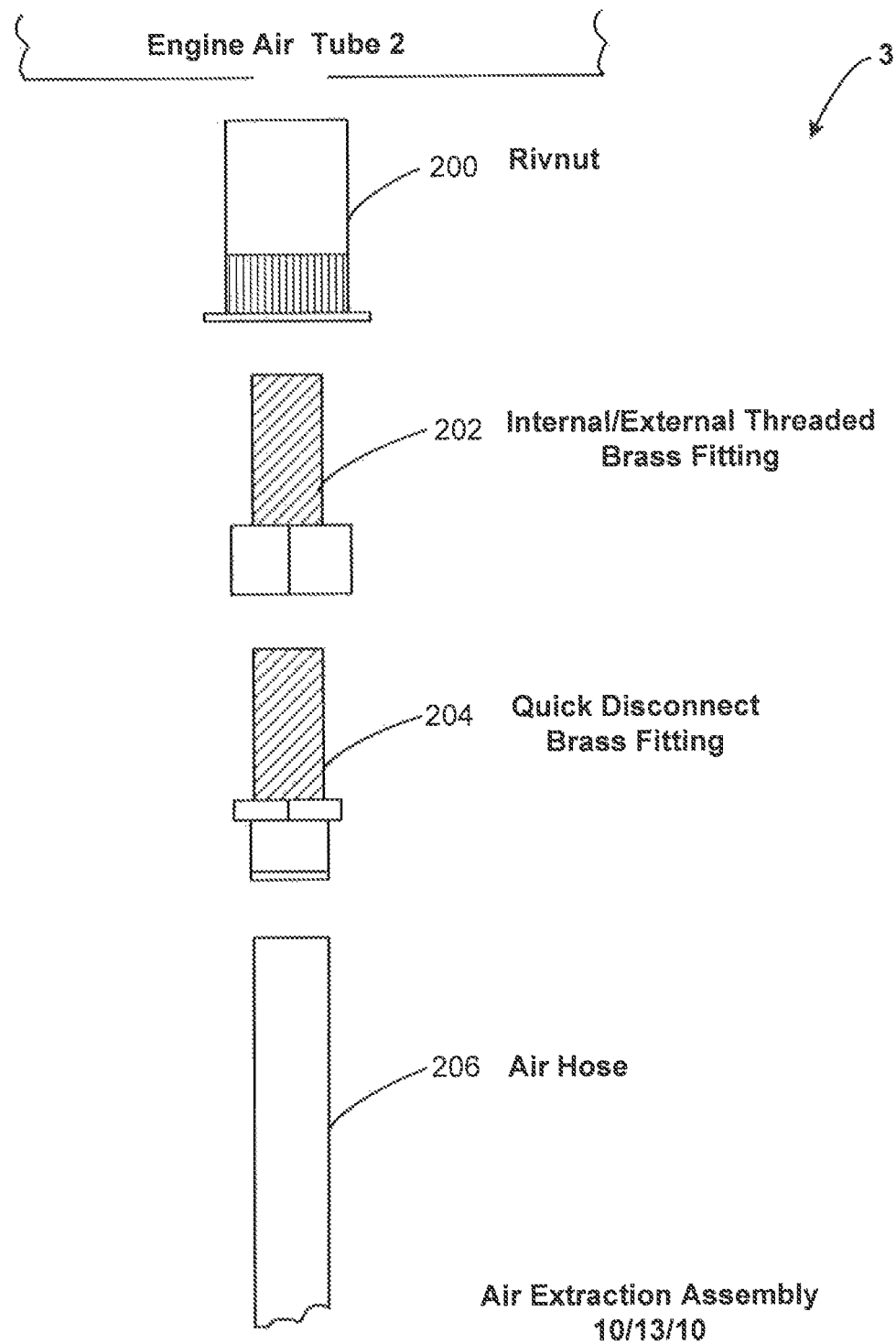
FIG. 2 illustrates an exemplary air extraction assembly.

With brief attention to FIG. 2, air extraction assembly 3 is shown in greater detail. In various embodiments, air extraction assembly may comprise a rivnut 200, a fitting 202, a fitting 204, and an air hose 206. Rivnut 200 may comprise, for example, any type of hollow rivet configured for insertion in a component or substrate material. Rivnut 200 may further comprise an internal threading. Further still, and in various embodiments, rivnut 200 may comprise a plastic nozzle. Rivnut 200 may yet further comprise a heat shrink and/or be secured to engine air tube 2 and/or air hose 4 by way of a heat shrink/material configured to shrink when heat is applied. Moreover, rivnut 200 may comprise Teflon and/or another coating or coated material suitable to limit or prevent build up of a catalyst thereon.

Fitting 202 and/or fitting 204 may comprise threaded and/or brass/black/galvanized fittings, and may be of any type suitable for coupling a hose, tube, or other hollow channel to rivnut 200. Fitting 204 may further comprise a quick disconnect fitting.

In operation, fitting 202 may couple to rivnut 200 by any suitable method or mechanism. For example, fitting 202 may threadably couple to rivnut 200. Fitting 202 may also couple to rivnut 200 by a pressure fitting mechanism and/or by way of any other suitable mechanism. Fitting 202 may further decouple from rivnut 200 by any suitable means, including, for example, by unthreading from rivnut 200. Fitting 202 may be further secured to rivnut 200 by a lockwasher and/or any other suitable mechanisms or methods. Likewise, in various embodiments, fitting 204 may couple to and decouple from fitting 202 by any of the mechanisms described elsewhere herein. For example, fitting 204 may threadably couple to and/or decouple from fitting 202. A pressure fitting may also be employed between fitting 202 and fitting 204. Similarly, air hose 206 may couple to and/or decouple from fitting 204 by any of the mechanisms described elsewhere herein. For example, air hose 206 may be pressurably and/or threadably fitted to fitting 204. Rivnut 200, fitting 202, fitting 204, and/or air hose 206 may be permanently coupled, e.g., by an injection molding technique, by an adhesive substance, by tacks, compression locking mechanisms, and/or by any other mechanism for permanently, semi-permanently, temporarily, provisionally, and/or removably securing such an assembly.

Air extraction assembly 3 may be coupled to the engine air tube 2 at a point succeeding or following output 1b of air intake 102 (i.e., where airflow is pressurized by air intake 102). In an embodiment, air extraction assembly 3 may be coupled to engine air tube 2 at a point prior to or preceding a point at which engine air tube 2 couples or is configured to couple to the air intake manifold of an internal combustion engine.

Returning now to FIG. 1B, air hose 4 may comprise any type of conduit or channel suitable for conducting or transferring air flow from one point to another. For example, air hose 4 may comprise a rubber hose, a plastic hose, a steel reinforced rubber and/or plastic hose, a metal braided hose, and/or any other type of suitable hose. Air hose 4 may be permanently, semi-permanently, temporarily, provisionally, and/or removably coupled to air extraction assembly 3.

Protective housing 5 may comprise a rigid enclosure. Protective housing 5 may therefore comprise any type of rigid, semi-rigid, and/or non-rigid material suitable for protecting or shielding one or more components, for example, from dirt, heat, inclement weather and/or engine conditions, damage, and the like. In an exemplary embodiment, protective housing 5 may comprise aluminum, steel, titanium, carbon fiber, brass, tin, metal alloys, one or more plastics, rubber, ceramic materials, and/or, generally, any other type of material or combination of materials suitable for protecting or shielding one or more components from dirt, heat, inclement weather and/or engine conditions, damage, and the like. In certain embodiments, protective housing 5 may be omitted from system 100. Further, in various embodiments, protective housing 5 may house one or more of filter 7, orifice 8, valve 6, connector 9a, and/or connector 9b.

Connector 9a may comprise any type of fitting capable of coupling air hose 4 to protective housing 5 and/or filter 7, including, for example, a barbed lug. Connector 9a may therefore comprise any fitting operable to couple to air hose 4. In an embodiment, connector 9a may couple to air hose 4 and/or filter 7 by way of one or more nipples, which may or may not be barbed or ridged. Similarly, in various embodiments, connector 9b may comprise any fitting operable to couple air hose 14 to orifice 8. Thus, in an embodiment, connector 9b may couple to air hose 14 and/or orifice 8 by way of one or more nipples or connectors, which, again, may or may not be barbed or ridged. Further, in certain embodiments, connectors 9a and 9b may be crimped at each end of protective housing 5, thereby securing air hose 4 and air hose 14 with protective housing 5. Further still, and in various embodiments, connectors 9a and/or 9b may couple to filter 7 and/or orifice 8, respectively, by way of one or more tubes, hoses, and/or conduits, which may comprise, for example, rubber, plastics, steel reinforced rubber and/or plastic, metal braided materials, and/or any other type of suitable material and/or combinations of suitable materials.

Filter 7 may comprise any type of air filter configured or configurable to remove debris, vapor, mist, particulate, and/or any other pollutant and/or impurity from an input gas (e.g., air or air mixed with a mist or vapor). In an embodiment, filter 7 may restrict or reduce a volume of airflow, such that a rate and/or volume of inflow to filter 7 is less than a rate and/or volume of outflow from filter 7. Further, in an embodiment, filter 7 may be omitted.

Orifice 8 may comprise a hollow channel or conduit configured or configurable to restrict and/or regulate a rate and/or volume of airflow, such that a rate and/or volume of inflow to orifice 8 is greater than a rate and/or volume of outflow from orifice 8. In various embodiments, orifice 8 may comprise a flow orifice and/or a flow restrictor or regulator, with fixed or variable inflow rate. In certain embodiments, orifice 8 may couple to filter 7 by way of one or more tubes, hoses, or conduits, which may comprise, for example, rubbers, plastics, steel reinforced rubbers and/or plastics, metal braided materials, and/or any other types of suitable materials and/or combinations of suitable materials. In an embodiment, orifice 8 may be omitted, in which case filter 7 may couple directly to connector 9b by way of any method described elsewhere herein.

Valve 6 may comprise any type of valve configured or configurable to operate at or above a specified pressure. Thus, in certain embodiments, valve 6 comprises a check valve, such as a ball check valve, a diaphragm check valve, a swing check valve, a titling disc check valve, a stop check valve, a lift check valve, a duckbill valve, and/or a crack pressure valve. In various embodiments, valve 6 may be located or coupled between connector 9a and filter 7, and/or between orifice 8 and connector 9b. Further, in various embodiments, valve 6 may be coupled to air hose 4 and/or to air hose 14, and/or located outside protective housing 5. In some embodiments, valve 6 may be omitted.

Air hose 14 may comprise any type of conduit or channel suitable for conducting or transferring air flow from one point to another. For example, air hose 14 may comprise a rubber hose, a plastic hose, a steel reinforced rubber and/or plastic hose, a metal braided hose, and/or any other type of hose, especially any type of hose or conduit described elsewhere herein. In various embodiments, air hose 14 may be permanently and/or removably coupled to an intake port of catalyst reservoir 106. Further, as described elsewhere herein, air hose 14 may be coupled to connector 9b.

Catalyst reservoir 106 may, as described elsewhere herein, comprise any type of reservoir or container configured or configurable to hold a catalyst. In various embodiments, catalyst reservoir 106 comprises a nebulizer. Catalyst reservoir 106 may comprise a reservoir input 10a and a reservoir output 10b. Catalyst input 10a may, in various embodiments, be coupled to air hose 14. Likewise, in various embodiments, reservoir output 10b may be coupled by way of return injector hose 15 and injector fitting 11 to engine air tube 2.

A catalyst may comprise any catalytically active component. Thus, a catalyst may comprise a variety of elements and/or chemicals, including, but not limited to, Platinum, Rhenium, Rhodium, Palladium, Silver, Lanthanum, Cerium, Niobium, Tantalum, Tin, Tungsten, Zirconium, Ruthenium, Vanadium, Manganese, Copper, Molybdenum, Chromium, Cobalt, Nickel, Iron, Zinc, Potassium, Sodium, Cesium, Iridium, Praseodymium, Neodymium, Rubidium, Barium, Calcium, Magnesium, Strontium, and/or combinations/compounds thereof. Catalysts may further comprise various mixtures of inorganic salts in propylene glycol and/or water.

Return injector hose 15 may comprise any type of conduit or channel suitable for conducting or transferring air flow from one point to another. For example, return injector hose 15 may comprise a rubber hose, a plastic hose, a steel reinforced rubber and/or plastic hose, a metal braided hose, and/or any other type of hose, especially any type of hose or conduit described elsewhere herein. Further, in various embodiments, return injector hose 15 may be permanently and/or removably coupled to engine air tube 2 by way of injector fitting 11. In certain embodiments, return injector hose 15 may be coupled to engine air tube 2 such that air exiting return injector hose 15 enters an input port 1a of air intake 102.

Injector fitting 11 may comprise any type of hollow fitting, tube, or rivet configured to couple return injector hose 15 to engine air tube 2 and/or for insertion in a component or substrate material. In various embodiments, injector fitting 11 may comprise a rivnut, as described elsewhere herein. Further, in various embodiments, injector fitting 11 may comprise an internal threading, a plastic nozzle, plastic or nylon tubing, and/or heat shrink/a material that shrinks when exposed to heat. For example, in various embodiments, injector fitting 11 may be secured to engine air tube 2 and/or return injector hose 15 by way of a heat shrink/material configured to shrink when heat is applied. Injector fitting 11 may further comprise Teflon or another coating or coated material suitable to limit or prevent build up of catalyst thereon.

In operation, system 100 may divert a volume of compressed air from output 1b of engine air tube 2 by way of air extraction assembly 3. The diverted air may pass through air hose 4, through connector 9a, and into filter 7. Filter 7 may remove impurities and or meter the air flowing therethrough. Valve 6 may prevent air from entering filter 7 where, for example, the internal combustion engine (not shown) to which system 100 is coupled is idling or otherwise operating at a low speed. Air may pass through orifice 8, which may further control and/or meter the airflow in system 100. Exiting orifice 8, air may enter air hose 14, and at this stage, air exiting orifice 8 is fully and reliably controlled and/or metered by the system 100 for use at catalyst reservoir 106 without the use of a dedicated pump or another electrical connection or piece of electrical or electromechanical equipment, such as an air pump.

Air hose 14 may transfer air to catalyst reservoir 106. Inside catalyst reservoir 106, pressurized and/or filtered air may assist in and/or cause the creation of a catalytic aerosol and/or mist. The catalytic aerosol and/or mist, comprising a return flow, may exit catalyst reservoir 106 through return injector hose 15. Return flow may enter engine air tube at or near input 1*a* of air intake 102. Indeed, in various embodiments, it is important that return flow enter air intake 102, because a pressure differential between injector fitting 11 and air extraction assembly 3 is necessary to draw air through system 100. In other words, were injector fitting 11 to be coupled to engine air tube 2 at a point in engine air tube 2 where airflow was pressurized (i.e., subsequent to the air intake 102), air would not enter air extraction assembly 3 (or an insufficient quantity of air would enter assembly 3), and the advantages of system 100 would be minimized, if not altogether lost.

Thus, system 100 offers a unique and cost effective method by which air may be mixed with an aerosol catalyst and/or mist prior to being supplied to an internal combustion engine. As described elsewhere herein, and aside from air intake 102, no other electric or electromechanical pump is required for operation of system 100 (because air intake 102 may comprise an existing air intake 102 as described herein), and, as such, an expensive and potentially failure prone component may be removed or excluded. Additionally, because system 100 may comprise a closed loop system, drawing air only from within an existing engine air stream (as opposed, for example, to a second external air source), the risk of introducing foreign contaminants into an engine and/or the air intake of an engine may be reduced. The system 100 thus permits the flow of pressurized air through a catalyst reservoir 106 to generate a consistent and measured flow of air including a catalyst into an internal combustion engine, rather than, for example, an inconsistent and generally less powerful draw, which may be created by certain Venturi systems.

Accordingly, system 100 provides a reliable and consistent method for delivering air intermixed with one or more catalysts to an internal combustion engine. Moreover, air and catalyst may be delivered to an internal combustion engine under one or more pressures (including at a standard or non-turbocharged/pressurized intake velocity), and these features may be adjusted to improve or customize the fuel efficiency and/or reduce the emissions associated with any internal combustion to which system 100 is coupled. In other words, in various embodiments, system 100 may be customized or optimized to an engine to which it is coupled. For example, larger engines may require or benefit from greater quantities of catalyst, while smaller engines may utilize less catalyst. Thus, system 100 (e.g., valve 6, filter 7, and/or orifice 8) may be adjusted and/or customized, so that an optimal or substantially optimal amount of catalyst and/or air flow is delivered to an engine.

System 100 may be further constructed, manufactured, packaged, delivered, and/or sold as a kit. Thus, for example, and in various embodiments, system 100 may be sold as a commercial off the shelf package (including some or all of the components described above). Further, the components comprising the kit may come as a preassembled system 100, a portion of a preassembled system 100, and/or entirely as separate components, any of which may be assembled and/or installed in a vehicle after the kit is opened. That is, for example, system 100 may be sold as a preassembled kit and/or installed by a person offering installation services. Further, in various embodiments, system 100 may be sold as a set of components, which may be coupled to a vehicle after purchase. Further, in various embodiments, system 100 may be installed in a more concise and integrated manner by an original equipment manufacturer.

Persons skilled in the art will readily appreciate that various aspects of the present invention may be realized by any number of methods and apparatuses configured to perform the intended functions. Stated differently, other methods and apparatuses may be incorporated herein to perform the intended functions. It should also be noted that the accompanying drawing figures referred to herein are not all drawn to scale, but may be exaggerated to illustrate various aspects of the present invention, and in that regard, the drawing figures should not be construed as limiting. Finally, although the present invention may be described in connection with various principles and beliefs, the present invention should not be bound by theory.

The foregoing disclosure is merely illustrative of the present invention and is not intended to be construed as limiting the invention. Although one or more embodiments of the present invention have been described, persons skilled in the art will readily appreciate that numerous modifications could be made without departing from the spirit and scope of the present invention. As such, it should be understood that all such modifications are intended to be included within the scope of the present invention.

The invention claimed is:

1. An apparatus for mixing air with a catalyst comprising:

an existing air intake configured to pressurize air and having an intake input and an intake output;

a catalyst reservoir having a reservoir input coupled to the intake output and a reservoir output coupled to the intake input;

an engine air tube that is configured to be coupled to an internal combustion engine and the existing air intake; and at least one of: an air filter, a restrictor and a valve coupled between the intake output and the catalyst reservoir.

2. The apparatus of claim 1, wherein the valve coupled between the intake output and the catalyst reservoir is configured to open in response to a pressure.

3. The apparatus of claim 1:
wherein the valve is coupled to the reservoir input; and
wherein the engine air tube has a first portion coupled between the intake input and the reservoir output and a second portion coupled between the intake output and the valve.

4. The apparatus of claim 1, further comprising a protective housing configured to encase at least one of the filter and the valve coupled between the intake output and the reservoir input.

5. The apparatus of claim 1, further comprising a regulating orifice configurable to restrict a flow rate of air to the catalyst reservoir and adjustable based upon a size of an internal combustion engine to which the apparatus is coupled.

6. A kit comprising:
an existing air intake and having an intake input and an intake output; and
a catalyst reservoir having a reservoir input configured to be coupled to the intake output and a reservoir output configured to be coupled to the intake input;
an engine air tube that is configured to be coupled to an internal combustion engine and the existing air intake; and
at least one of: an air filter, and a valve configured to be coupled between the intake output and the catalyst reservoir.

7. The kit of claim 6, wherein the valve comprises a pressure valve.

8. The kit of claim 6:
wherein the valve is configured to be coupled to the reservoir input; and
wherein the engine air tube has a first portion configured to be coupled between the intake input and the reservoir output, and a second portion configured to be coupled between the intake output and the valve.

9. The kit of claim 6, further comprising a protective housing configured to encase at least one of the air filter and the valve.

10. The kit of claim 6, further comprising a regulating orifice configurable to restrict a flow rate of air to the catalyst reservoir and adjustable based upon a size of an internal combustion engine.

11. A method for mixing air with a catalyst comprising:
coupling a reservoir input of a catalyst reservoir to an output of an existing air intake;
coupling a reservoir output of the catalyst reservoir to an input of the existing air intake;
coupling an engine air tube to an internal combustion engine and the existing air intake; and
coupling at least one of: an air filter and a valve between the output of the existing air intake and the catalyst reservoir.

12. The method of claim 11, further comprising:
coupling the valve to the reservoir input; and
coupling a first portion of the engine air tube between the input of the existing air intake and the reservoir output and a second portion of the engine air tube between the output of the existing air intake and the valve.

13. The method of claim 11, further comprising encasing at least one of: the air filter and the valve coupled between the output of the existing air intake and the reservoir input.

14. The method of claim 11, further comprising coupling to the output of the existing air intake a regulating orifice configurable to restrict a flow rate of air to the catalyst reservoir and adjustable based upon a size of an internal combustion engine and an operating load of the internal combustion engine.

* * * * *